United States Patent [19]

Romero

[11] 4,068,573

[45] Jan. 17, 1978

[54] UTENSIL FOR CRACKING EGGS

[76] Inventor: Angel L. Romero, 2700 Southern Ave., No. B, South Gate, Calif. 90280

[21] Appl. No.: 693,739

[22] Filed: June 7, 1976

[51] Int. Cl.² ............... A23N 5/00; A47J 43/00; A47J 13/00; B26B 17/00

[52] U.S. Cl. ............................ 99/578; 99/582; 30/120.1

[58] Field of Search ............... 99/497–498, 99/578, 581–582; 30/120.1

[56] References Cited

U.S. PATENT DOCUMENTS

| 824,748 | 7/1906 | Schneider | 30/120.1 |
|---|---|---|---|
| 1,727,465 | 9/1929 | Hamilton | 30/120.1 |
| 2,612,921 | 10/1952 | Tomola | 30/120.1 |
| 2,794,471 | 6/1957 | Brackman | 30/120.1 |

Primary Examiner—Leonard D. Christian
Assistant Examiner—Robert Pous
Attorney, Agent, or Firm—Francis X. LoJacono, Sr.

[57] ABSTRACT

A utensil for cracking eggs comprising tongs having oppositely disposed handles pivotally attached to each other having a gripping end, and eggshell-cracking and separating members formed at the opposite distal end thereof, the pivot connection of the handles being positioned intermediate the ends thereof and provided with a biasing spring to keep the cracking and separating members in a closed abutting relationship. An egg is positioned within adjacent supporting rings which are flexibly connected to respective handles so as to be opened together with the separating members, after the egg is cracked, by applying force against the cracking member.

3 Claims, 6 Drawing Figures

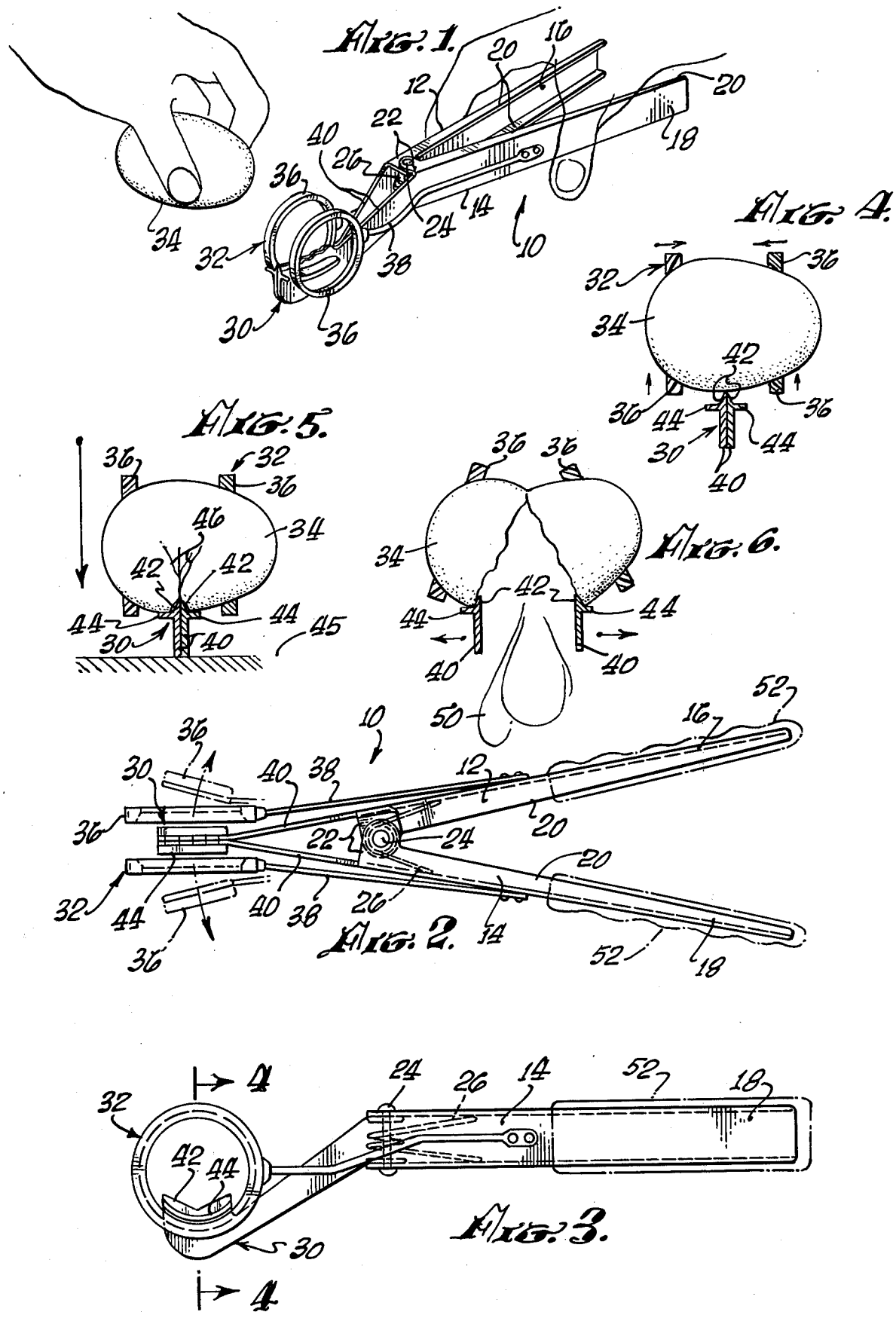

UTENSIL FOR CRACKING EGGS

BACKGROUND OF THE INVENTION

1. Field of the Invention

This invention relates generally to a kitchen utensil and, more particularly, to a utensil used to crack open and separate the shell of an egg.

2. Description of the Prior Art

Various problems and difficulties are very often encountered when eggs are cracked for extracting the contents therefrom. If the egg is not hit with the proper direct force, the shell might crack into a plurality of small sections, with one or more of these pieces penetrating the egg; and then these pieces must be removed without affecting the yoke.

Also, when the shell is hit harder than necessary, there is often a chance of breaking the yoke.

Hence, there is a need for a device wherein the shell can be cracked in the proper manner without causing damage to the yoke or allowing parts of the shell to fall within the egg yoke and white. The applicant's device as herein disclosed solves the above problems.

SUMMARY OF THE INVENTION

The present invention comprises a kitchen utensil designed to crack and separate the shell of an egg to allow the contents therein to be discharged or extracted without breaking the yoke.

The new device comprises tongs having a pair of handle members pivotally joined together intermediate their ends to allow the handles to open and close during the operation thereof.

Each handle is provided with a gripping end and an oppositely disposed cracking and separating end. That is, the gripping ends of the device are squeezed inwardly about the substantially centrally located pivot point against the force of the spring biased handles, forcing a pair of oppositely disposed egg supporting rings to open widely to receive an egg therebetween. The rings are flexibly attached to each respective handle and are arranged in a juxtapositioned, closely aligned proximity to each other, whereby the inward biasing force of the tongs holds the egg in position for the cracking members.

At this time, the tongs with the egg therein are stroked downwardly against a surface member, causing the egg to crack substantially in the center of the egg shell. Once the shell is cracked, the tongs are spread apart—separating the broken shell and allowing the yoke to be extracted therefrom without damage thereto.

OBJECTS AND ADVANTAGES OF THE INVENTION

The present invention has for an important object a provision wherein an egg can be cracked in a simple manner without damage to the yoke.

It is another object of the invention to provide a utensil for cracking eggs wherein the utensil comprises tongs having cracking and separating members to allow each egg to be cracked without causing the shell to shatter into multiple fragments.

It is still another object of the present invention to provide an egg-cracking utensil that allows even small children to successfully crack an egg without damaging the yoke therein.

It is a further object of the invention to provide a device of this character that has relatively few operating parts.

It is still a further object of the invention to provide a device of this character that is simple to operate and easy to keep clean.

Still another object of the invention is to provide a device of this character that is relatively inexpensive to manufacture.

It is still a further object of the invention to provide a kitchen utensil of this type that is simple and rugged in construction.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

DESCRIPTION OF THE DRAWINGS

Referring more particularly to the accompanying drawings, which are for illustrative purposes only:

FIG. 1 is a perspective view of the present invention, showing an egg being inserted therein;

FIG. 2 is a top plan view thereof;

FIG. 3 is a side-elevational view thereof;

FIG. 4 is a cross-sectional view taken substantially along line 4—4 of FIG. 3, and including an egg disposed therein;

FIG. 5 is a cross-sectional view similar to FIG. 4, wherein the cracking members are shown breaking the egg shell; and FIG. 6 is a view illustrating the egg shell being separated, allowing the yoke to be released therefrom.

DESCRIPTION OF THE PREFERRED EMBODIMENT

Referring more particularly to FIG. 1, there is shown an egg-cracking utensil, generally indicated at 10, forming tongs which are pivotally arranged to receive and support an egg therein to be cracked.

The tongs comprise a pair of elongated handles 12 and 14 oppositely positioned in parallel relation to each other, and each being pivotable with respect thereto. Each handle is defined by a gripping end member 16 and 18 respectively, the gripping members being formed in a channel-like configuration having inturned flanges 20 which provide strength thereto to prevent flexing of the gripping portion of the tongs 10. These flanges terminate inwardly about the central point of the handles, wherein ear members 22 are bent inwardly to provide part of the pivoting means. The pivoting means also includes a pivot pin 24 which passes through each set of ears 22, thereby holding each handle in pivoting arrangement.

A biasing means, such as spring 26, is provided to spread the handles 12 and 14 apart in a normal manner, and causes the forward end of the handles to be normally closed. The spring 26 is typically positioned about pivot pin 24, as seen in FIGS. 2 and 3.

The opposite ends of the handles 12 and 14 are formed with cracking and separating means indicated generally at 30, which directly engage the egg when supported in the egg-supporting means, designated generally at 32.

Accordingly, the gripping ends 16 and 18 of handles 12 and 14 are squeezed inwardly against the force of biasing spring 26, at which time egg 34 is inserted into supporting means 32. The supporting means comprises a pair of supporting rings 36, which will be formed from any suitable material, preferable plastic. Each ring is flexibly attached to the sides of handles 12 and 14 by flexible struts 38. This flexibility allows for various sized eggs to be positioned between each support ring, as seen in FIG. 4. Once the rings engage egg 34, the egg will be generally centrally located in a transverse relationship with respect to the cracking-and-separating means 30.

As can be seen in FIG. 4, egg 34 rests upon the sheet-cracking-and-separating means 30, wherein the means comprises a pair of downwardly extending arms 40 which define the forward end of handles 12 and 14. Each arm member terminates with an upwardly projecting blade member 42, the blade being formed with a wedged-shaped edge, as seen in FIG. 3. Thus, the shell of the egg 34 is cradled in the wedged configuration to provide maximum contact therewith. Integrally formed below each blade member 42 and laterally extending therefrom is an arcuate shoulder 44 which limits the penetration of the blade 42 through the egg so as not to damage the yoke therein. This is clearly shown in FIG. 4.

Thus, once the egg is positioned as in FIG. 4, the tongs are impacted against a stationary object, such as a table top or pan, represented at 45. That is, the individual who is to crack the egg hits the arms 40 against a stationary object which causes blades 42 to cut into the shell, at which time cracks 46 are created.

After cracking the shell, the cracking means then becomes the separating means. The separating means includes arms 40, blades 42, shoulder members 44 and support rings 36.

Accordingly, after the egg is cracked, the gripping portion of the tongs are again squeezed separating the arms 40, whereby the egg is pulled apart by blades 42 while being held in place by shoulders 44 and rings 36, as shown in FIG. 6. Thus, the yoke as indicated at 50 is allowed to be released from the shell without any damage thereto or having egg-shell particles intermingled therewith.

It should be understood that the tongs can be made of any suitable material; however, it is contemplated that metal of the type normally used in kitchen utensils will be employed, since this device lends itself to a stamping method of manufacture.

In addition, various protective covers can be provided to be affixed to the gripping end of the handles, as indicated at 52 in FIGS. 2 and 3.

The invention and its attendant advantages will be understood from the foregoing description and it will be apparent that various changes may be made in the form, construction and arrangement of the parts of the invention without departing from the spirit and scope thereof or sacrificing its material advantages, the arrangement herein before described being merely by way of example, and I do not wish to be restricted to the specific form shown or uses mentioned, except as defined in the accompanying claims.

I claim:

1. A utensil for cracking and separating egg shells, to allow the yoke therein to be extracted therefrom, said utensil comprising:
   a tongue having a pair of handles including a gripping portion formed at one end thereof, and longitudinal extending arm members formed at the opposite end thereof;
   pivotal means operably interconnecting each handle thereof;
   biasing means engaging said handles, forcing said gripping portion thereof apart;
   cracking-and-separating means formed on the ends of said extending arm members to operate with said gripping ends of said handles;
   egg-supporting means comprising a pair of juxtapositioned support-ring members positioned adjacent said cracking-and-separating means, a flexible strut member being secured at one end of said ring members, and the other end being secured to said respective handles;
   said cracking-and-separating means comprising:
      a pair of upwardly extended blade members integrally formed on each of said arm members, and centrally positioned between and below said support-ring members, wherein each blade member includes a wedged-shaped cutting edge having a substantially "V"-shaped configuration, so as to directly engage the shell of an egg disposed between said ring member, thus cracking said shell into two sections as the extending arm members are stroked downwardly against a surface area; and
      a shoulder member laterally extending outwardly from said arm member, adjacent and below said blade members, whereby each shell section is supported on said shoulders during separation thereof.

2. A utensil as recited in claim 1, wherein said pivotal means comprises:
   a pair of laterally, inwardly extended ear members integrally formed on each handle; and
   a pivot pin connecting said handles and disposed through said ear members.

3. A utensil as recited in claim 2, wherein said biasing means comprises a coil spring disposed between said handles, whereby said blades are held in an abutting arrangement.

* * * * *